(12) United States Patent
Cline et al.

(10) Patent No.: US 7,185,516 B2
(45) Date of Patent: Mar. 6, 2007

(54) WASHWATER NEUTRALIZATION SYSTEM FOR GLASS FORMING LINE

(75) Inventors: Harry B. Cline, Heath, OH (US); William E. Downey, Granville, OH (US); Liang Chen, New Albany, OH (US); William R. Cooper, Johnstown, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 508 days.

(21) Appl. No.: 10/160,842

(22) Filed: May 31, 2002

(65) Prior Publication Data

US 2003/0221457 A1  Dec. 4, 2003

(51) Int. Cl.
*C03B 37/07* (2006.01)

(52) U.S. Cl. .............. 65/484; 134/56 R; 134/113; 134/111

(58) Field of Classification Search .......... 134/56 R, 134/57 R, 113, 110, 186; 65/503, 484
See application file for complete search history.

(56) References Cited

U.S. PATENT DOCUMENTS

| | | | | |
|---|---|---|---|---|
| 2,063,140 A | * | 12/1936 | Allison | 137/3 |
| 3,356,565 A | * | 12/1967 | Smucker et al. | 162/199 |
| 3,551,250 A | * | 12/1970 | Paoletti | 65/503 |
| 3,714,039 A | * | 1/1973 | Lancy et al. | 210/743 |
| 3,718,556 A | * | 2/1973 | Rohrback | 205/743 |
| 3,791,807 A | * | 2/1974 | Etzel et al. | 65/451 |
| 3,794,299 A | * | 2/1974 | Wagner et al. | 210/198.1 |
| 3,801,243 A | * | 4/1974 | Smith et al. | 65/503 |
| 3,966,600 A | * | 6/1976 | Crowley et al. | 210/713 |
| 4,013,039 A | * | 3/1977 | Kubilius et al. | 118/688 |
| 4,104,024 A | * | 8/1978 | Vogele et al. | 422/37 |
| 4,109,481 A | * | 8/1978 | Peek | 62/140 |
| 4,190,481 A | * | 2/1980 | Goffredo | 156/345.15 |
| 4,211,517 A | * | 7/1980 | Schmid | 417/12 |
| 4,261,720 A | * | 4/1981 | Helbing | 65/474 |
| 5,077,361 A | | 12/1991 | Hughes et al. | |
| 5,137,694 A | * | 8/1992 | Copeland et al. | 422/106 |
| 5,294,686 A | | 3/1994 | Fiarman et al. | |

(Continued)

FOREIGN PATENT DOCUMENTS

JP        09094598        8/1997

(Continued)

OTHER PUBLICATIONS

WO 92/22507 Dec. 1992.*

*Primary Examiner*—Frankie L. Stinson
(74) *Attorney, Agent, or Firm*—Inger H. Eckert; Maria C. Gasaway

(57) ABSTRACT

A neutralization system for controlling the pH of the washwater used to clean and maintain polyacrylic bound glass forming equipment. The neutralization system introduces a base solution to a washwater solution when the pH of the washwater solution contained in a closed loop washwater recovery system falls below approximately 8.0, thereby substantially reducing the corrosion rate of the components of the equipment associated with acidic polyacrylic acid binder and washwater solution. A closed-loop hoodwall washwater recovery system may also be introduced in addition to the neutralization system that allows for the recovery and reuse of polyacrylic acid binder with a minimal amount of base solution, thereby minimizing degradation of insulation properties of polyacylic acid bound glass fiber products.

12 Claims, 2 Drawing Sheets

U.S. PATENT DOCUMENTS

| | | | |
|---|---|---|---|
| 5,318,990 A | 6/1994 | Strauss | |
| 5,340,868 A | 8/1994 | Strauss et al. | |
| 5,578,371 A | 11/1996 | Taylor et al. | |
| 5,646,207 A | 7/1997 | Schell | |
| 5,661,213 A | 8/1997 | Arkens et al. | |
| 5,670,585 A | 9/1997 | Taylor et al. | |
| 5,690,715 A | 11/1997 | Schiwek | |
| 5,718,728 A | 2/1998 | Arkens et al. | |
| 5,763,524 A | 6/1998 | Arkens et al. | |
| 5,770,555 A | 6/1998 | Weinstein | |
| 5,840,822 A | 11/1998 | Lee et al. | |
| 5,855,792 A * | 1/1999 | Adams et al. | 210/696 |
| 5,858,549 A | 1/1999 | Kielbania, Jr. et al. | |
| 5,866,664 A | 2/1999 | McCallum, III et al. | |
| 5,891,972 A | 4/1999 | Egraz et al. | |
| 5,932,665 A | 8/1999 | DePorter et al. | |
| 5,932,689 A | 8/1999 | Arkens et al. | |
| 5,977,224 A | 11/1999 | Cheung et al. | |
| 5,977,232 A | 11/1999 | Arkens et al. | |
| 6,136,916 A | 10/2000 | Arkens et al. | |
| 6,194,512 B1 | 2/2001 | Chen et al. | |
| 6,207,737 B1 | 3/2001 | Schell et al. | |
| 6,218,483 B1 | 4/2001 | Muthiah et al. | |
| 6,221,973 B1 | 4/2001 | Arkens et al. | |
| 6,241,780 B1 | 6/2001 | Arkens et al. | |
| 6,331,350 B1 | 12/2001 | Taylor et al. | |
| 6,398,964 B1 * | 6/2002 | Brady et al. | 210/638 |

FOREIGN PATENT DOCUMENTS

| | | |
|---|---|---|
| WO | WO 99/61384 | 12/1999 |
| WO | WO 01/00699 | 1/2001 |

* cited by examiner

WASHWATER NEUTRALIZATION SYSTEM FOR GLASS FORMING LINE

TECHNICAL FIELD

The present invention generally to washwater systems for glass forming lines and more specifically washwater neutralization systems for glass forming lines.

BACKGROUND OF THE INVENTION

In the fiberglass industry, washwater systems remove excess binder from the equipment used to form fiberglass insulation products. This allows the equipment to be operated at optimum efficiency to maximize glass throughput. The washwater equipment also prevents damage due to the buildup of binder, thereby limiting the amount of downtime associated with equipment cleaning, repair and replacement. This equipment includes but is not limited to forming conveyors, forming hoodwalls, suction boxes, drop boxes, and forming fans.

Polycarboxylic acid based fiberglass binder resins have been used in the glass industry for insulation applications. Polycarboxylic acid based binders provide advantages in these applications in terms of mechanical properties and decreased reliance on environmental control equipment.

One problem with currently available washwater systems is that the polyacrylic acid binder, and hence the reclaim water, becomes acidic as the number of cycles of removing binder increases. This acidic reclaim water can corrode the walls of the forming and washwater equipment, which is typically made of carbon steel, thereby limiting the equipment's useful life. This results in added manufacturing costs due to equipment replacement and downtime. This also can result in decreased efficiency in the glass manufacturing process, resulting in increased manufacturing costs associated with rework and the like.

Various solutions have tried to address this corrosion problem. For example, stainless steel can replace carbon steel in the forming and washwater equipment due to its non-corrosive nature. However this equipment is expensive relative to carbon steel equipment.

Another solution proposed is to decrease the amount of cycles that reclaim water is introduced through the forming equipment. However, this also leads to increased costs in terms of water usage and wastewater removal. This also decreases the efficiency of the forming equipment associated with replacing the reclaim water.

It is thus highly desirable to improve the corrosion resistance of forming equipment and washwater equipment.

SUMMARY OF THE INVENTION

The present invention reduces the corrosion rate of forming and washwater equipment by controlling the pH to approximately 8.0 or above of reclaimed washwater used to clean the equipment and wash the uncured polyacrylic binder and fiberglass from the equipment.

To accomplish this, a washwater neutralizing system is introduced within the closed loop system to ensure that the washwater is maintained at 8 and above. This is accomplished by coupling a pH probe to the inside of a washwater holding tank to monitor the pH of the washwater. If the pH is measured by the probe at below 8.0, a pump will introduce a quantity of the base solution, preferably a hydroxide solution, to the tank until the pH is raised to at least 8.0. This ensures that reclaim washwater, used to wash the uncured binder and fibers from the equipment, is maintained at a pH which limits corrosion of the equipment. This increases the useful life of the forming equipment and decreases manufacturing costs associated with repair and replacement of forming equipment due to acid corrosion.

In another preferred embodiment, a closed-loop hoodwall reclaim washwater system is introduced in addition to the washwater reclaim washwater system. The hoodwall reclaim washwater system pumps washwater from a separate washwater tank to remove excess polyacrylic acid binder from the hoodwalls of the forming area or may be used as makeup water for preparation of the aqueous binder. The closed-loop hoodwall reclaim washwater system is not coupled to the washwater neutralizing system, so the washwater that is reclaimed is substantially free of base solution. The reclaimed washwater may then be returned to a binder makeup tank for reuse, thereby reducing binder costs. Further, because the recovered binder is substantially base solution free, bound fiberglass containing the recovered binder experiences better and more consistant curing as compared with binders having small amount of base solution, as even small amounts of base solution within the binder can inhibit curing of the binder. Also, bound fiberglass products having substantially base solution-free binders have decreased degradation rates associated with water absorption caused by the presence of polyacrylic acids salts, degradation that affects the insulating properties such as recovery, stiffness, and R-value of these products. The second reclaim system would therefore minimize the amount of base solution in the binder makeup, thereby reducing curing problems associated with the base solution. The second reclaim system also increases the amount of recoverable binder, thereby decreasing binder costs.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

DETAILED DESCRIPTION AND PREFERRED EMBODIMENTS OF THE INVENTION

Figure 1:
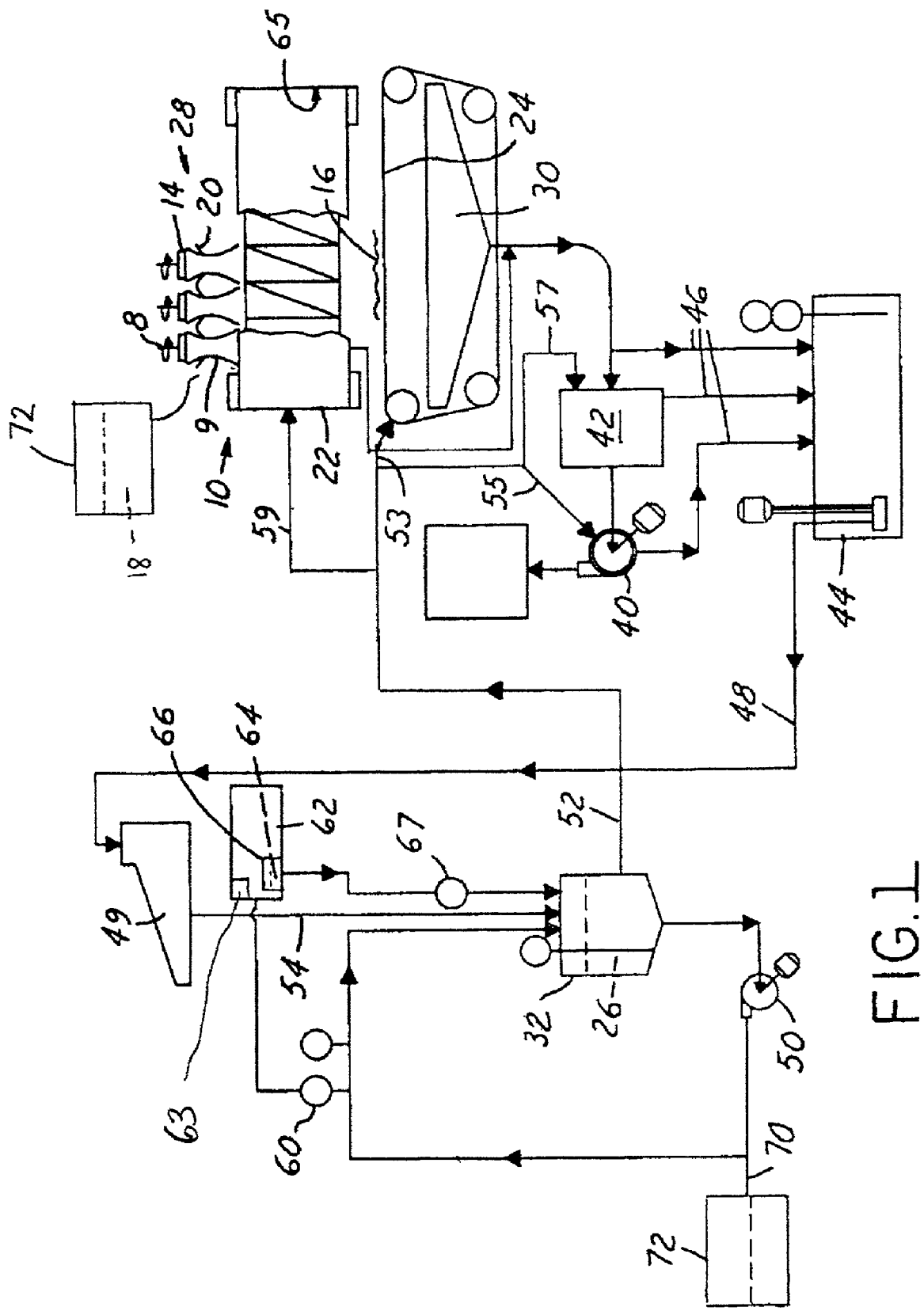
FIG. 1 illustrates a fiberglass forming line having a closed-loop washwater recovery system according to one preferred embodiment of the present invention.

FIG. 1 illustrates a fiberglass forming line 10 having a closed-loop washwater recovery system 12 according to one preferred embodiment of the present invention.

Fiberglass is formed on the forming line 10 in a multistep process. Molten glass is first introduced from a furnace (not shown) through a bushing (not shown) to a spinner 14 that forms a plurality of fiberglass fibers 8 in a method well known in the art. A water-based polyacrylic binder 18 from a binder makeup tank 72 is sprayed onto the fibers 8 by a plurality of spaced nozzles (not shown) contained on a binder ring 20 to form an uncured binder coated fiber 9.

The polyacrylic acid binder 18 applied to the fibers 8 is conventional and comprise polyacrylic acids having glycerol and triethanolamines as crosslinking groups. Suitable binders are disclosed in U.S. patent application Ser. No. 09/814,034 entitled "Low Odor Insulation Binder from Phosphite Terminated Polyacrylic Acid" filed Mar. 21, 2001; U.S. patent application Ser. No. 09/871,467 entitled "Surfactant-Containing Insulation Binder" filed May 31, 2001; U.S. Pat. No. 6,194,512 entitled "Corrosion Inhiniting Composition for Polyacrylic Acid Based Binders" all of which are incorporated herein by reference. Binder is diluted to a preferred application viscosity with water to between approximately 3 to 25% solids.

The fibers 9 are then introduced through a forming hoodwall 22 that confines the fibers 9. The walls 65 of the hoodwall comprise a continuous moving belt that contain the fibers 8 and binder 18 within the forming hood. The fibers 9 are gathered onto a forming conveyor 24 by pulling a large volume of air across a series of perforated plates on the conveyor 24 using a forming fan 40. The fibers 9 form an uncured pack 16 on the forming conveyor 24. A drop out box 42 slows down the velocity of air between the conveyor 24 and forming fan 40 so that fibers 9 and binder 18 droplets which pass through the forming conveyor 24 are substantially prevented from reaching the forming fan 40.

The walls 65 of the forming section are washed with a washwater solution 26 introduced from a washwater tank 32 through a pump 50 and inlet line 52 to application devices 28 that pack rinse walls 65 of the forming hoodwall 22 with the solution 26. The washwater solution 26 removes excess binder 18 from the walls 65 of the forming hoodwall 22. The excess binder 18 and washwater solution 26 is then removed from the forming hoodwall 22 is collected and returned to the washwater. The collected tank 32 polyacrylic acid coated fiberglass pack 16 is then moved along the conveyor 24 to an oven (not shown) for subsequent curing and processing to form glass fiber insulation products. The method for forming the glass pack 16, introducing the binder 18, and subsequent formation of fiberglass insulation products such as batts, rolls, blowing wool and board products from the pack 16 is well known in the art and not relevant to the present invention except as directed to the closed-loop washwater recovery system 12 that is the subject of the present invention.

The washwater solution 26 is also introduced separately via input lines 53, 55, 57, 59 to remove excess binder 18 from the suction boxes 30, forming fan 40, drop out boxes 42, and forming hoodwall 22, respectively. This ensures clean surfaces and optimum performance for the equipment. The washwater solution 26 is then gathered from the boxes 30, 42, fan 40, forming hoodwall 22, and conveyor 24 into a washwater sump 44 via lines 46. The sump 44 pumps the washwater solution 26 and excess binder 18 via outlet line 48 to a shaker screen 49, in which glass fibers and partially cured particles of binder 18 are removed. The remaining solution 26 containing liquid binder 18 is returned to a washwater tank 32 via line 54.

The washwater tank 32 contains one or more pH probes 60 that provide electrical feedback to a processor 63 of the neutralization system 62. When the pH probes 60 indicate that the pH of the washwater solution 26 is less than approximately 8.0, the processor 63 of the neutralization system 62 interprets an electrical signal from the pH probes 60 and directs the introduction of a base solution 64 into the washwater tank 32 through pump 67 from a holding tank 66 that is either contained within or coupled to the neutralization system 62. This ensures that washwater solution 26 pumped through the closed-loop washwater recovery system 12 is maintained at a pH that will not corrode the forming conveyor 24, suction boxes 30, forming fan 40, drop out boxes 42, duct work and environmental equipment (not shown).

Preferably, the base solution 64 comprises a weak acid/strong base salt that is soluble in water and can neutralize the washwater solution 26 without the production of insoluble salts. Further, the base solution should not buffer the washwater solution 26 to an extent that the washwater solution 26 may not be able to be removed from the washwater tank 32 and used to prepare phenolic binders. The base solution 64 may be solid sodium hydroxide or a solution of any available concentration, preferably a 50% by weight solution of sodium hydroxide dispersed in water. However, other hydroxide solutions may be used as the base solution 64 such as calcium hydroxide or ammonium hydroxide. However, calcium hydroxide has limited solubility in water and the insoluble salts tend to settle out and cause potential pluggage problems. Also, ammonium hydroxide releases ammonia, and therefore environmental concerns in terms of plant emissions would likely have to be addressed.

Further, other weak acid/strong base salts such as sodium bicarbonate can be used in the base solution 64. However, these salts are not preferred in that they will buffer the washwater solution 26 to an extent that the washwater solution 26 may not be able to be removed from the washwater tank 32 and used to prepare phenolic binders.

The reclaimed washwater solution 26 containing the binder 18 may be siphoned from the tank 32 through line 70 and placed into a binder makeup tank 72. Here, the binder 18 material may be recovered from the washwater solution 26 and reused in the application process. This can reduce binder 18 costs, therein helping to minimize the manufacturing costs for making insulation products.

By maintaining the washwater at a pH of approximately 8.0 or above, the corrosion rate of the equipment in the forming area may be minimized as compared with prior art systems utilizing a closed-loop washwater system without an associated neutralizing system 62.

Figure 2:
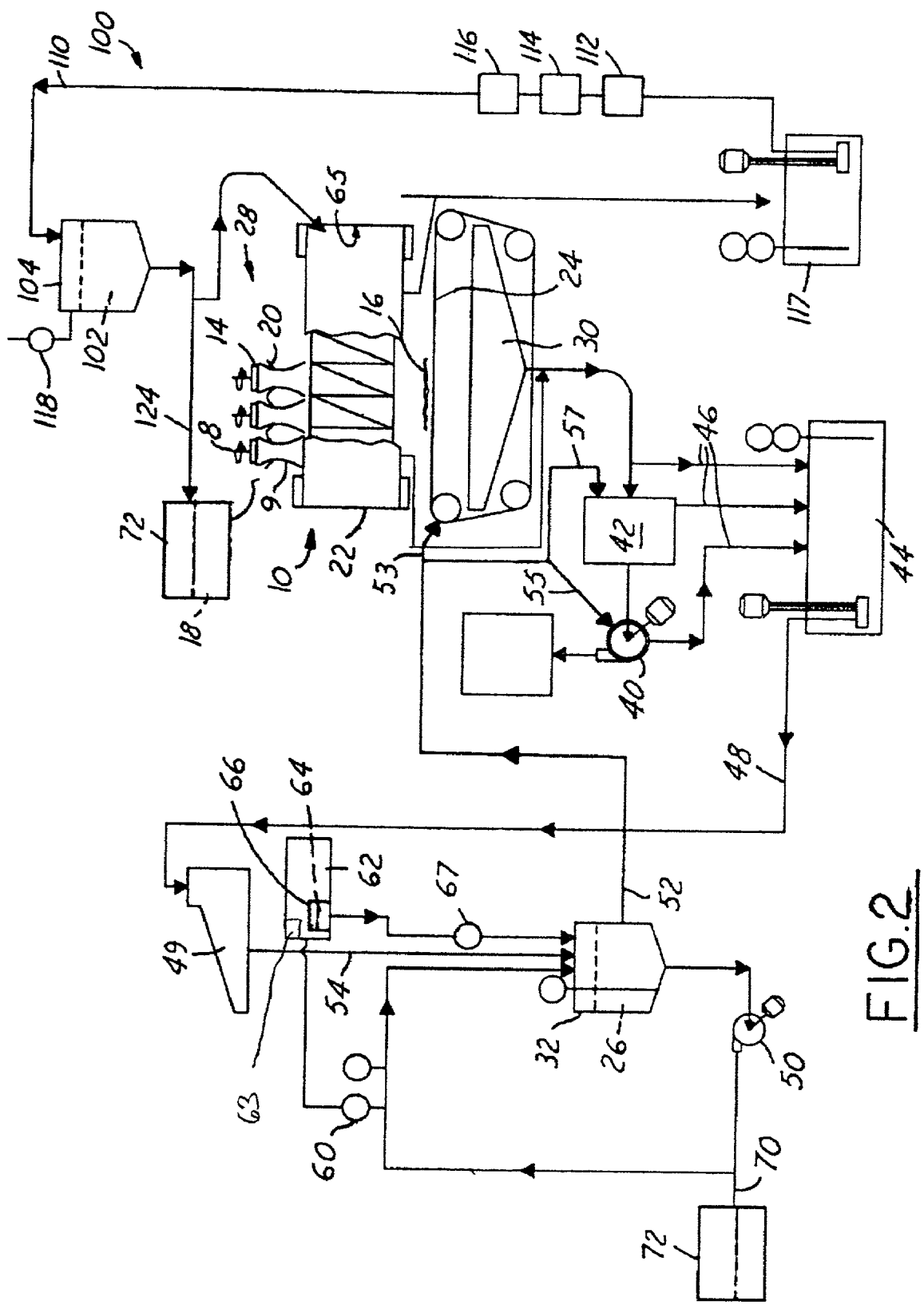
FIG. 2 illustrates a fiberglass forming line having a closed-loop washwater recovery system and a closed-loop hoodwall washwater recovery system according to another preferred embodiment of the present invention.

In another preferred embodiment, as shown in FIG. 2, input line 59, which supplied washwater solution 26 to the walls 65 of the forming hoodwall 22 of FIG. 1, is replaced with a closed-loop hoodwall washwater recovery system 100.

Referring now to FIG. 2, washwater solution 102 is introduced from a hoodwall reclaim recirculation tank 104 of the system 100 through a line 106 to the walls 65 of the forming hoodwall 22 to remove excess binder 18 that may have accumulated on the walls 106. The excess binder 18 and washwater solution 102 is then returned to the tank 104 via pump 117 through line 110 after passing through a series of filters 112 or a shaker screen 114, or centrifuge 116, or a combination of all three as shown here. The filters 112, shaker screens 114, and/or centrifuge 116 removes glass fibers and suspended partially cured particles of binder 18 from the washwater solution 102 prior to reintroduction to the recirculation tank 104. Water may be introduced by a pump 118 to the tank 104 to replace water lost in the process. All wetted parts of the hoodwall reclaim system 100 should be stainless steel or contain a corrosion resistant material.

The reclaimed washwater solution 102 containing the binder 18 may be siphoned from the tank 104 through line 124 and placed into a binder makeup tank 72. As the binder 18 is a water-based binder as described above, the binder 18 and washwater solution 102 may be reused in the application process. This can reduce binder 18 costs, therein helping to minimize the manufacturing costs for making insulation products.

The addition of a second closed-loop hoodwall washwater recovery system 100 offers advantages as compared with FIG. 1. For example, the second system 100 increases the amount of recoverable binder 18. Further, the binder 18 recovered is substantially free of the base solution 64. This is important because the base solution 64 adversely affects the curing of reclaimed binder 18 used in glass fiber products if the base 64 is not removed.

Further, by minimizing the amount of base solution 64 in the pack 16, the amount of polyacrylic acid salt contained in the finished insulation product made from the pack 16 is also minimized. This is important because the polyacrylic acid salt increases the potential for water absorption within the finished insulation product, water absorption which can lead to an increase in degradation of the insulation properties of the finished insulated product during storage and subsequent use.

While the invention has been described in terms of preferred embodiments, it will be understood, of course, that the invention is not limited thereto since modifications may be made by those skilled in the art, particularly in light of the foregoing teachings.

What is claimed is:

1. A washwater recovery system for a glass forming line, said washwater recovery system being used to remove excess binder from equipment used in forming glass fibers, comprising:
    a first loop including:
        a washwater sump coupled to said equipment for collecting used washwater solution containing a washwater solution, excess binder, partially cured particles of said binder, and loose glass fibers from said equipment;
        a filtering apparatus coupled to said washwater sump for receiving used washwater solution therefrom, said filtering apparatus being operable to remove said partially cured particles of binder and said loose glass fibers from said used washwater solution to provide a reclaimed washwater; and
        a washwater tank fluidly coupled to said equipment to provide a quantity of said washwater solution thereto, said washwater tank receiving said reclaimed washwater from said filtering apparatus; and
    a second loop coupled to said washwater tank to draw said reclaimed washwater therefrom to create said washwater solution, including:
        at least one pH probe capable of measuring the pH of said washwater solution;
        a neutralization system electrically coupled to said at least one pH probe, said neutralization system including:
            a processor; and
            a holding tank having a quantity of base solution; and
        a binder recovery tank operable to recover said excess binder from said reclaimed washwater for use in said equipment thus creating said washwater solution, said washwater solution being returned to said washwater tank;
        wherein said processor can interpret an electrical signal from said at least one pH probe representing the pH of said washwater solution and direct a quantity of said base solution from said holding tank to said washwater tank when the pH of said washwater solution as interpreted by said processor is less than approximately 8.0.

2. The glass forming line of claim 1, wherein said base solution comprises a hydroxide base that is soluble in water and will form and neutralize said washwater solution without the production of insoluble salts.

3. The glass forming line of claim 2, wherein said base solution comprises a hydroxide solution selected from the group consisting of a sodium hydroxide solution, a calcium hydroxide solution and an ammonium hydroxide solution.

4. The glass forming line of claim 3, wherein said hydroxide solution comprises an approximately 50% by weight hydroxide solution in water.

5. The glass forming line of claim 1, further comprising a closed-loop hoodwall washwater recovery system coupled to a forming hoodwall, wherein said closed-loop hoodwall washwater recovery system is not coupled to said neutralization system.

6. The washwater recovery system of claim 1, further comprising at least one pH probe positioned in said washwater tank for measuring the pH of said washwater solution.

7. A glass forming line having a closed-loop washwater recovery system, said closed-loop washwater recovery system used to remove excess binder from equipment used in forming glass fibers, the closed-loop washwater recovery system comprising:
    a washwater tank fluidly coupled to the equipment, said washwater tank having a quantity of a first washwater solution;
    at least one pH probe positioned within said washwater tank capable of measuring the pH of said quantity of said first washwater solution within said washwater tank;
    a neutralization system electrically coupled to said at least one pH probe, said neutralization system including:
        a processor; and
        a holding tank having a quantity of base solution;
    a washwater sump coupled to said equipment for collecting said first washwater solution, partially cured particles of binder, and loose glass fibers from said equipment; and
    a filtering apparatus for removing said partially cured particles of binder and said loose glass fibers from said first washwater solution, said filtering apparatus interconnecting said washwater tank and said washwater sump;
    wherein said processor can interpret an electrical signal from said at least one pH probe representing the pH of said quantity of first washwater solution and direct a quantity of said base solution from said holding tank to said washwater tank when the pH of said first washwater solution as interpreted by said processor is less than approximately 8.0; and
    wherein said washwater tank is coupled to a first binder makeup tank, said first binder makeup tank for receiving reclaimed first washwater solution containing said binder.

8. The washwater recovery system of claim 7, further comprising a second binder makeup tank coupled to a forming hoodwall for delivery of said binder to said glass fibers.

9. A glass forming line having a closed-loop washwater recovery system, said closed-loop washwater recovery system used to remove excess binder from equipment used in forming glass fibers, the closed-loop washwater recovery system comprising:

a washwater tank fluidly coupled to the equipment, said washwater tank having a quantity of a first washwater solution;

at least one pH probe positioned within said washwater tank capable of measuring the pH of said quantity of said first washwater solution within said washwater tank;

at least one pH probe positioned in said closed-loop washwater recovery system external to said washwater tank for measuring the pH of said washwater solution;

a neutralization system electrically coupled to said at least one pH probe, said neutralization system including
a processor; and
a holding tank having a quantity of base solution;

a washwater sump coupled to said equipment for collecting said first washwater solution, partially cured particles of binder, and loose glass fibers from said equipment; and a filtering apparatus for removing said partially cured particles of binder and said loose glass fibers from said first washwater solution, said filtering apparatus interconnecting said washwater tank and said washwater sump;

wherein said processor can interpret an electrical signal from said at least one pH probe representing the pH of said quantity of first washwater solution and direct a quantity of said base solution from said holding tank to said washwater tank when the pH of said first washwater solution as interpreted by said processor is less than approximately 8.0.

10. A washwater recovery system for removing excess polyacrylic acid binder from equipment utilized in forming glass fibers having said polyacrylic acid binder bound to a surface thereof and for reducing acid corrosion in said equipment caused by said polyacrylic acid binder, comprising:

a first loop including:
a washwater sump coupled to said equipment for collecting used washwater solution therefrom, said used washwater solution including washwater solution and excess binder;

a washwater tank fluidly coupled to said washwater sump and being operable to direct a flow of said washwater solution to said equipment;

a pH probe positioned within said washwater tank capable of measuring the pH of said washwater solution;

a neutralization system electrically coupled to said pH probe, said neutralization system including:
a processor; and
a holding tank having a quantity of base solution, said base solution comprising a hydroxide base that is soluble in water and will neutralize said washwater solution without the production of insoluble salts; and a second loop operably coupled to said washwater tank, including:
a binder recovery tank fluidly coupled to said washwater tank for removing said excess binder from said used washwater solution and returning washwater solution to said washwater tank, wherein said processor can interpret an electrical signal from said pH probe representing the pH of said quantity of washwater solution and direct a quantity of said base solution from said holding tank to said washwater tank when the pH of said washwater solution as interpreted by said processor as being less than approximately 8.0.

11. The washwater recovery system of claim 10, wherein said second loop further includes a pH probe for measuring the pH of said washwater solution returned to said washwater tank.

12. The washwater recovery system of claim 10, further comprising a second binder makeup tank coupled to a forming hoodwall for delivery of said binder to said glass fibers.

* * * * *